(12) United States Patent
Mekala et al.

(10) Patent No.: US 7,627,004 B2
(45) Date of Patent: Dec. 1, 2009

(54) TRANSPORTING SYNCHRONIZATION CHANNEL INFORMATION ACROSS A PACKET NETWORK

(75) Inventors: Anantha R. Mekala, Leominster, MA (US); George O. Ogagan, Nashua, NH (US)

(73) Assignee: CISCO Technology, Inc., San Jose, CA (US)

( * ) Notice: Subject to any disclaimer, the term of this patent is extended or adjusted under 35 U.S.C. 154(b) by 566 days.

(21) Appl. No.: 11/138,599

(22) Filed: May 26, 2005

(65) Prior Publication Data

US 2006/0268832 A1    Nov. 30, 2006

(51) Int. Cl.
    *H04J 3/06*    (2006.01)
(52) U.S. Cl. ...................................... 370/509
(58) Field of Classification Search ................. 370/352, 370/353, 354, 401, 466, 314, 321, 324, 326, 370/337, 347, 350, 467, 509, 510–514
    See application file for complete search history.

(56) References Cited

U.S. PATENT DOCUMENTS

| | | | | |
|---|---|---|---|---|
| 4,873,683 | A * | 10/1989 | Borth et al. ................. | 370/350 |
| 5,546,444 | A * | 8/1996 | Roach et al. ............. | 455/412.2 |
| 5,579,300 | A * | 11/1996 | Lee et al. .................... | 370/385 |
| 5,873,043 | A * | 2/1999 | Comer ........................ | 370/474 |
| 6,058,117 | A | 5/2000 | Ennamorato et al. | |
| 6,198,936 | B1 * | 3/2001 | Yang et al. ................. | 370/347 |
| 6,333,931 | B1 | 12/2001 | LaPier et al. | |
| 6,359,887 | B1 | 3/2002 | Brockhage et al. | |
| 6,370,155 | B1 * | 4/2002 | Cantwell et al. ............ | 370/465 |
| 6,539,237 | B1 | 3/2003 | Sayers et al. | |
| 6,542,754 | B1 | 4/2003 | Sayers et al. | |
| 6,611,531 | B1 | 8/2003 | Chen et al. | |
| 6,729,929 | B1 | 5/2004 | Sayers et al. | |
| 6,731,640 | B1 * | 5/2004 | Perry et al. .............. | 370/395.6 |
| 6,731,649 | B1 * | 5/2004 | Silverman ................... | 370/466 |
| 6,816,447 | B1 * | 11/2004 | Lee et al. ................. | 369/59.19 |
| 6,854,031 | B1 | 2/2005 | Ouellet et al. | |
| 6,870,856 | B1 * | 3/2005 | Schroth ....................... | 370/503 |
| 7,242,696 | B2 * | 7/2007 | Grundvig et al. ............ | 370/350 |
| 2002/0057676 | A1 * | 5/2002 | Cohen-Adiv et al. ........ | 370/352 |
| 2002/0141434 | A1 * | 10/2002 | Grundvig et al. ............ | 370/442 |
| 2003/0123451 | A1 * | 7/2003 | Nielsen et al. ........... | 370/395.4 |
| 2003/0189954 | A1 * | 10/2003 | Miki et al. ................... | 370/509 |
| 2004/0213205 | A1 * | 10/2004 | Li et al. ...................... | 370/352 |
| 2005/0100018 | A1 * | 5/2005 | Kennedy et al. ......... | 370/395.2 |
| 2005/0180410 | A1 * | 8/2005 | Pepenella ................... | 370/386 |

\* cited by examiner

*Primary Examiner*—Chirag G Shah
*Assistant Examiner*—Joshua Smith
(74) *Attorney, Agent, or Firm*—Hamilton, Brook, Smith & Reynolds, P.C.

(57) ABSTRACT

A technique for preserving information contained in a synchronization channel of a Time Division Multiplexing (TDM) frame across a packet network. Information contained in the synchronization channel of TDM frames is transferred over the packet network by a first gateway device that received the TDM frames. A second gateway device receives the synchronization channel information and places the information in one or more TDM frames. The TDM frames are transferred onto the TDM network.

22 Claims, 13 Drawing Sheets

500 ered TRANSPORTING SYNCHRONIZATION
CHANNEL INFORMATION ACROSS A
PACKET NETWORK

FIELD OF THE INVENTION

The present invention relates to communication networks and in particular to preserving information contained in a synchronization channel of time division multiplexing (TDM) frames across a packet-based network.

BACKGROUND OF THE INVENTION

For many years it was quite common for service providers to utilize traditional Time Division Multiplexing (TDM) networks that employ TDM switches to carry information, such as voice signals, across the TDM network. In a typical arrangement, voice signals from a conversation originating at a telephone are converted to digital information and placed into TDM frames. The TDM frames travel through the TDM network via a series of TDM switches to a destination endpoint. At the destination endpoint, the voice information is extracted from the TDM frames and converted back to voice signals which are played by a, e.g., telephone at the destination of the conversation.

Nowadays, packet-based networks are increasingly being used to transport information contained in TDM frames over portions of TDM networks. The attractiveness of packet-based networks relates to their lower cost as well as their versatility.

Since much of the current-day communications networks have been built on a TDM-based architecture, many service providers have been replacing only portions of their TDM networks with packet-based networks in order to maintain backward compatibility with existing TDM equipment. Here, the service provider may replace selected TDM links with a packet-based network that comprises a combination of gateway devices and packet switches. Gateway devices are typically used because the format of TDM frames carried in the TDM network often differ from the format of packets carried in a packet network. The gateway devices are thus employed to "translate" between the TDM frames and the packets.

In a typical arrangement, TDM frames are forwarded to the gateway device which reformats information contained in the frames, such as voice signal information, into packets. These packets are then carried by packet switches in the packet network to another gateway device which receives the packets, reformats the information contained in the packets into one or more TDM frames, and transfers the frames over the TDM network. The gateway devices may also be configured to remove TDM frames corresponding to silence, and/or digitally compress the voice signals to enhance performance and attain better bandwidth efficiency.

Conventional gateway devices often "terminate" certain channels of a TDM frame because the channels carry information that is typically used locally between TDM switches. For example, it is not uncommon for gateways to terminate "channel 0" of E1 frames as this channel typically conveys synchronization information that is used locally by the TDM switches to synchronize the transfer of E1 frames across an E1 link.

One problem with terminating channels at a gateway is that data transmitted on the terminated channels are dropped and not propagated across the packet network. For example, as noted above, conventional gateway devices terminate "channel 0" of an E1 frame because the channel usually carries synchronization information. However, in accordance with the E1 standard, the channel may also carry data in bits known as "SA bits." This SA bit data may include information that may be collected and used at various points in a TDM switch, such as operations and maintenance (OAM) data, performance data and the like. Since gateway devices normally terminate "channel 0" the data contained in the channel is lost.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
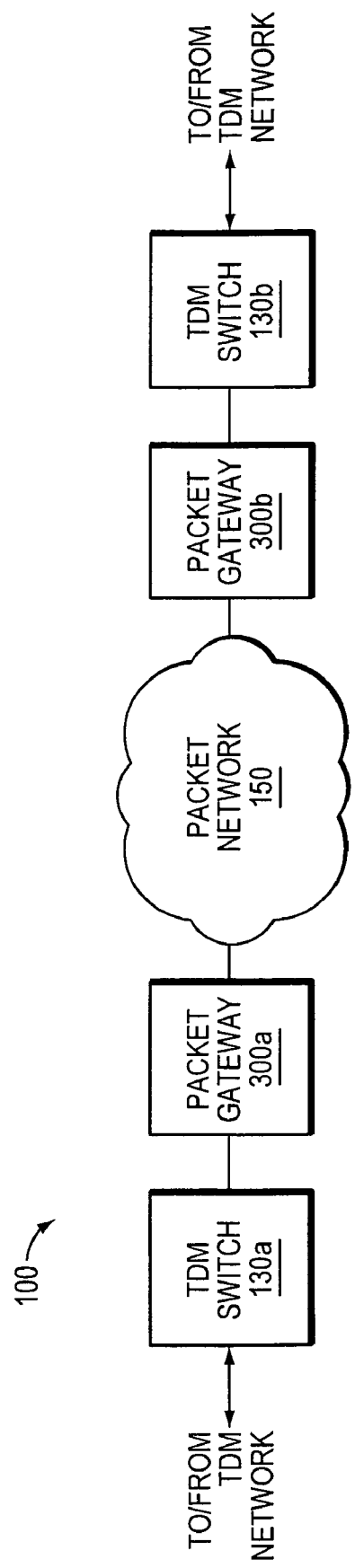
FIG. 1 is a high-level block diagram of a communication network that may implement the present invention.

FIG. 1 is a high-level block diagram of an exemplary communication network 100 in which the invention may be implemented. Network 100 comprises Time Division Multiplexing (TDM) switches 130, gateways 300 and a packet network 150. The TDM switches 130 are part of a TDM network which may be, for example, the public switched telephone network (PSTN).

The TDM switches 130 are coupled to gateways 300 which, in turn, are coupled to the packet network 150. The gateways 300 act to translate between TDM frames carried by the TDM network and packets carried by the packet network 150. The combination of the gateways 300 and the packet network 150 acts as a packet transport that, as will be described further below, transports information in the form of packets between the TDM switches 130. Illustratively, the packet network 150 is an Asynchronous Transfer Mode (ATM) network but other packet-based networks may be used, such as a frame relay (FR) or Ethernet networks. Packets may be transferred over the packet network 150 using various protocols, such as Multiprotocol Label Switching (MPLS), Voice over FR (VoFR), Voice over Internet Protocol (VoIP) and Voice over ATM (VoATM).

Operationally, TDM frames are forwarded by a TDM switch 130 to a gateway 300 which processes information contained in the TDM frames and places the information into one or more packets. The packets are then transported over the packet network 150 to a remote gateway 300. The remote gateway 300 removes the TDM frame information from the packets, places the information into one or more TDM frames and forwards the TDM frames to a remote TDM switch 130 in the TDM network.

Figure 2:
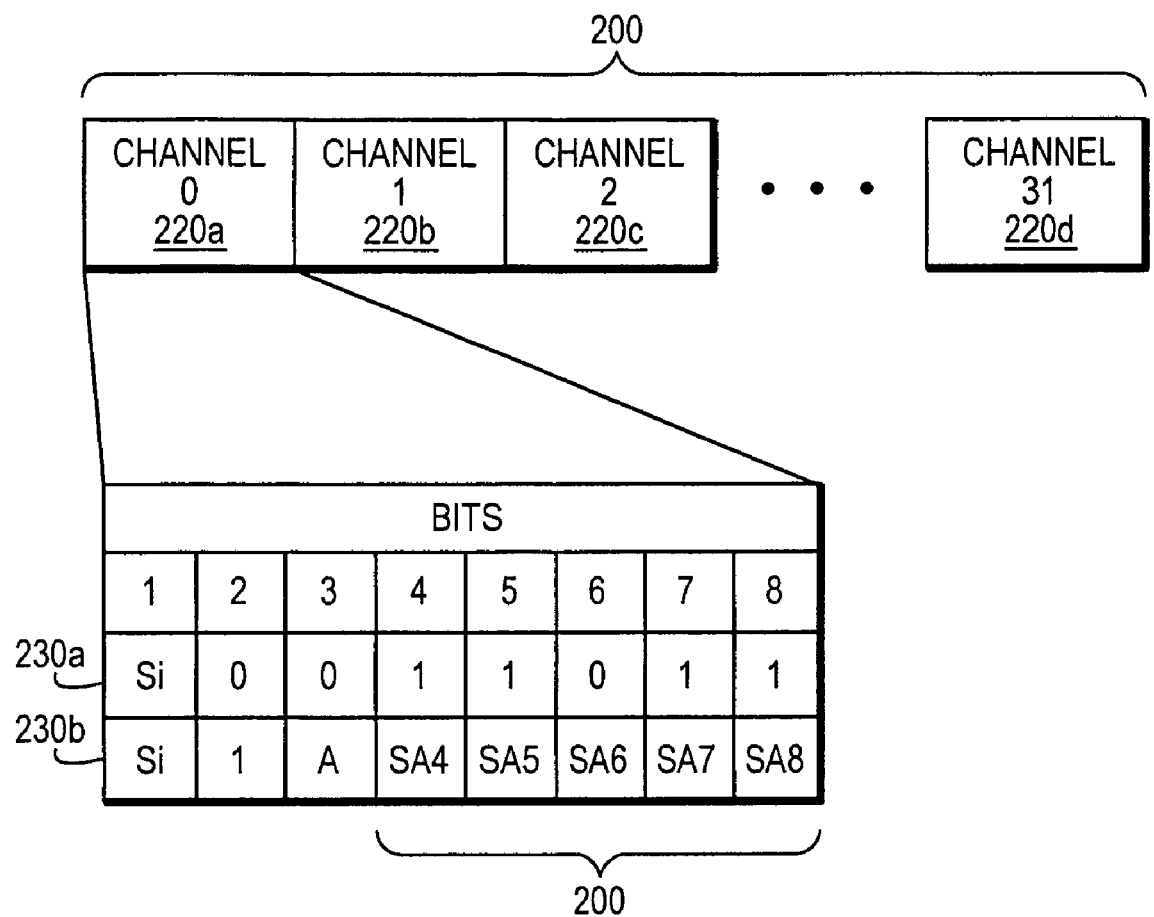
FIG. 2 illustrates a Time Division Multiplexing (TDM) frame that may be used with the present invention.

FIG. 2 illustrates a TDM frame 200 that may be used with the present invention. Frame 200 is illustratively an E1 frame comprising 32 channels (timeslots) 220 numbered 0 through 31 wherein each channel is configured to carry information across a TDM network. E1 frame formats are defined in the G.704 standard which is available from the International Telecommunication Union (ITU), Geneva, Switzerland. "Channels 1-15" and "channels 17-31" of the frame 200 typically carry voice information, "channel 16" typically carries signaling information and "channel 0" (i.e., the synchronization channel) typically carries a combination of synchronization information that is used to synchronize communication across E1 links as well as data information encoded in data bits known as "SA bits." Specifically, the information carried in "channel 0" 220a alternates between a frame alignment signal (FAS) 230a that holds a synchronization pattern and a non-FAS (NFAS) 230b that holds, inter alia, data information. That is, a frame 200 containing the FAS 230a is followed by a frame 200 that contains the NFAS 230b and vice-versa. The FAS 230a includes a reserved bit ("Si" bit) followed by a frame synchronization bit pattern of binary B'0011011. The NFAS 230b includes a reserved bit ("Si" bit) followed by a bit set to 1, a remote alarm indicator ("A" bit) and data 228 commonly referred to as "SA bits" (SA4-SA8). The SA bits may be configured to hold various types of information including, e.g., operations and maintenance (OAM) information, performance information, file data and so on. Further, this information may be included in High-Level Data Link Control (HDLC) frames encoded into the SA bits 228.

The present invention relates to a technique for preserving information contained in a synchronization channel of TDM frames across a packet network. According to an aspect of the technique, a gateway device at the edge of the packet network (a) receives the TDM frames, (b) extracts data (e.g., SA bit data) contained in the synchronization channel of the TDM frames, and (c) transfers the extracted data onto the packet network. Another gateway device at the edge of the packet network (a) eventually receives the synchronization channel data, (b) places the synchronization channel data into one or more TDM frames and (c) transfers the TDM frames onto the TDM network.

Advantageously, by transporting information contained in the synchronization channel across a packet network, the present invention enables information, such as SA bit data and HDLC information, contained in the synchronization channel to be preserved across a packet network that is incorporated in a TDM network.

Figure 3:
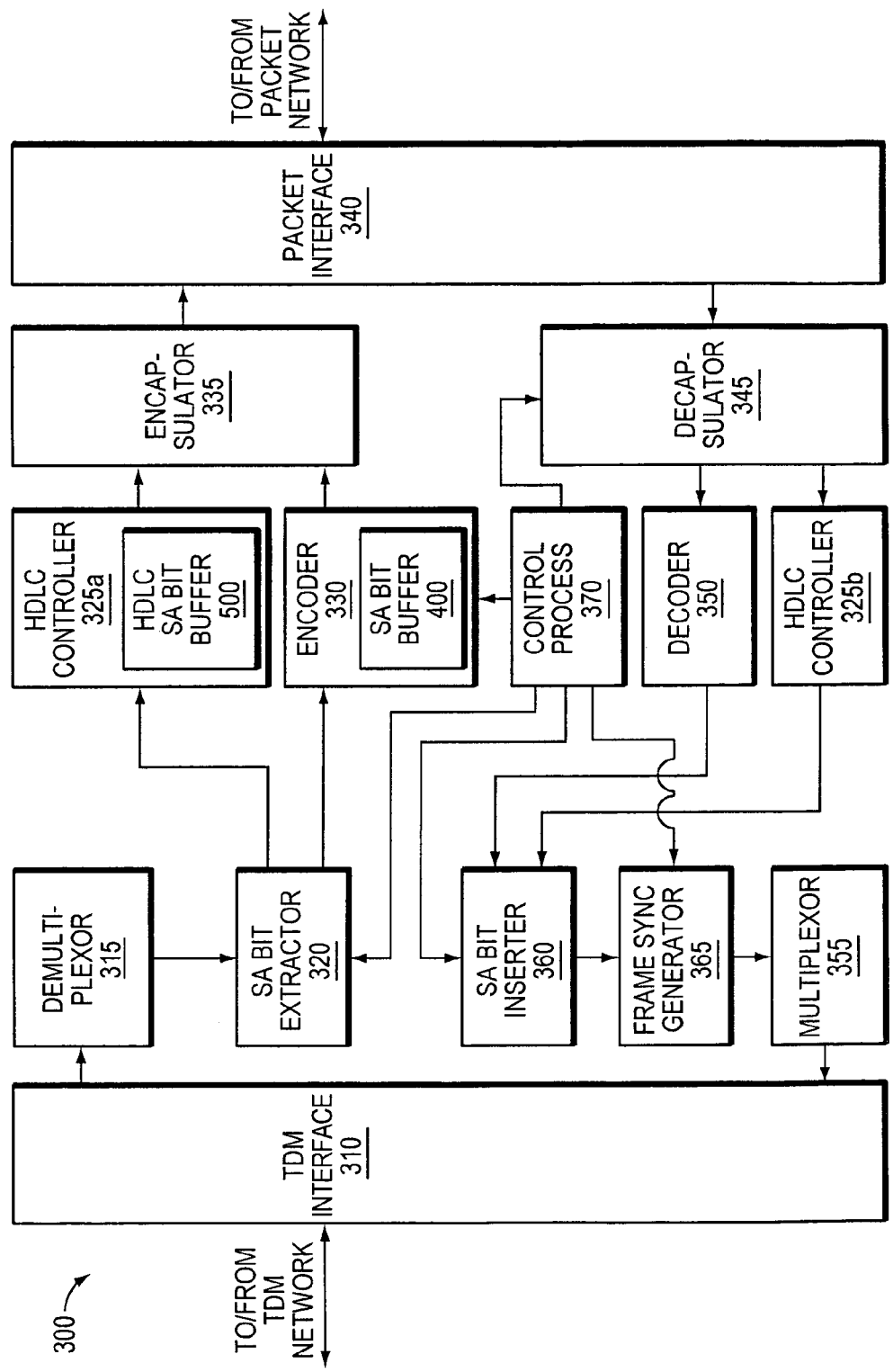
FIG. 3 is a high-level partial block diagram of a gateway device that may be used with the present invention.

FIG. 3 is a high-level partial schematic block diagram of a gateway 300 that may be used with the present invention. Gateway 300 comprises various components including a TDM interface 310, a demultiplexor 315, an SA bit extractor 320, an encoder 330, High-Level Data Link Control (HDLC) controllers 325, an encapsulator 335, a packet interface 340, a decapsulator 345, a decoder 350, a control process 370 an SA bit inserter 360, a frame synchronization (SYNC) generator 365 and a multiplexor 355. A suitable gateway that may be used with the present invention is the Cisco MGX 8880 media gateway switch available from Cisco Systems Inc., San Jose, Calif. 95134.

The TDM 310 and packet 340 interfaces are configured to interface the gateway 300 with the TDM network and the packet network, respectively, and, enable the gateway 300 to communicate with other devices in the network 100 using various protocols. To that end, the interfaces 310, 340 illustratively comprise conventional interface circuitry that incorporates signal, electrical and mechanical characteristics, and interchange circuits, needed to interface with the physical media of the network 100 and protocols running over that media.

The demultiplexor 315 is configured to "demultiplex" data contained in channels of TDM frames into a series of data streams, portions of which are fed to SA bit extractor 320. The SA bit extractor 320 is configured to extract SA bits from a data stream fed to the SA bit extractor 320. The SA bit extractor 320 is further configured to be programmed by the control process 370 to transfer the extracted SA bits to either the encoder 330 or the HDLC controller 325a or both.

The HDLC controllers 325a-b are conventional HDLC controllers that are configured to process HDLC frames that are encoded in the SA bits. Specifically, HDLC controller 325a is configured to extract ("deframe") information (e.g., payload data) from HDLC frames encoded in the SA bits 228 of received TDM frames 200. Likewise, HDLC controller 325b is configured to place the information contained in packets received by the gateway 300 into HDLC frames that are then encoded in the SA bits 228 of TDM frames transferred onto the TDM network.

The encoder 330 is configured to, inter alia, buffer SA bit data extracted by the SA bit extractor 320. The encapsulator 335 is configured to encapsulate information contained in the data streams into e.g., ATM Adaptation Layer 2 (AAL2) data packets and forward the packets to the packet interface 340 for transfer onto the packet network.

Packets received from the packet network 150 by the packet interface 340 are forwarded to the decapsulator 345. The decapsulator 345 extracts data contained in each packet and transfer the data to either the decoder 350 or the HDLC controller 325b. "Channel 0" data transferred to the decoder 350 is passed through the decoder 350 to the SA bit inserter 360. "Channel 0" data transferred to the HDLC controller 325b is placed in HDLC frames which are transferred to the SA bit inserter 360.

The frame sync generator 365 generates FAS 230a and NFAS 230b values for frames 200 generated by the multiplexor 355. Data transferred to the SA bit inserter 360 is placed into the SA bits 228 of an NFAS 230b generated by the frame sync generator 365. The multiplexor 355 generates TDM frames 200 which contain the FAS 230a and NFAS 230b values generated by the frame sync generator 365. The TDM frames 200 are transferred by the multiplexor 355 to the TDM interface 310 which places the TDM frames 200 onto the TDM network. The control process 370 is configured to control various functions of and/or provide information to the encoder 330, SA bit extractor 320, decapsulator 345, SA bit inserter 360 and framer 365.

Illustratively, E1 TDM frames 200 are received by the TDM interface 310 and transferred to the demultiplexor 315 which demultiplexes the TDM frames into 32 data streams wherein each data stream contains data for a particular E1 channel. The data stream for "channel 0" is transferred to the SA bit extractor 320. The SA bit extractor 320 extracts the SA bits from the "channel 0" data stream and transfers the extracted SA bits to either the encoder 330 or the HDLC controller 325a or both depending on the programmable configuration of the SA bit extractor 320 as determined by the control process 370. The HDLC controller 325a "deframes" HDLC frames encoded in the SA bits, extracts the data in the payload portion of the HDLC frames, buffers the data in the HDLC SA bit buffer 500 (described further below) and transfers the payload data from the buffer 500 to the encapsulator 335. Data received by the encoder 330 is buffered in the SA bit buffer 400 (described further below) and the buffered data is transferred from the buffer 400 to the encapsulator 335. The encapsulator 335 encapsulates the data into data packets (e.g., AAL2 packets) for transfer onto the packet network via the packet interface 340.

Packets received by the packet interface 340 are transferred to the decapsulator 345. The decapsulator 345 extracts data contained in each packet and transfers data associated with "channel 0" to either the HDLC controller 325b or the decoder 350, or both depending on the programmable configuration of the decapsulator 345 as determined by the control process 370. The HDLC controller 325b receives the "channel 0" data, places the "channel 0" data into the payload portion of HDLC frames and transfers the HDLC frames to the SA bit inserter 360. Data transferred to the decoder 350 is transferred to SA bit inserter 360 which places the data in NFAS values 230b generated by the frame sync generator 365. The NFAS values 230b are placed in frames 200 generated by the multiplexor 355 which afterwards transfers the frames 200 to the TDM interface 310 for transfer onto the TDM network.

It should be noted that functions performed by the components of the Gateway 300, including functions that implement aspects of the present invention, may be implemented in whole or in part using some combination of hardware and/or software. It should be further noted that computer-executable instructions and/or computer data that implement aspects of the present invention may be stored in a computer-readable medium, such as volatile memories, non-volatile memories, removable disks and non-removable disks.

Figure 4:
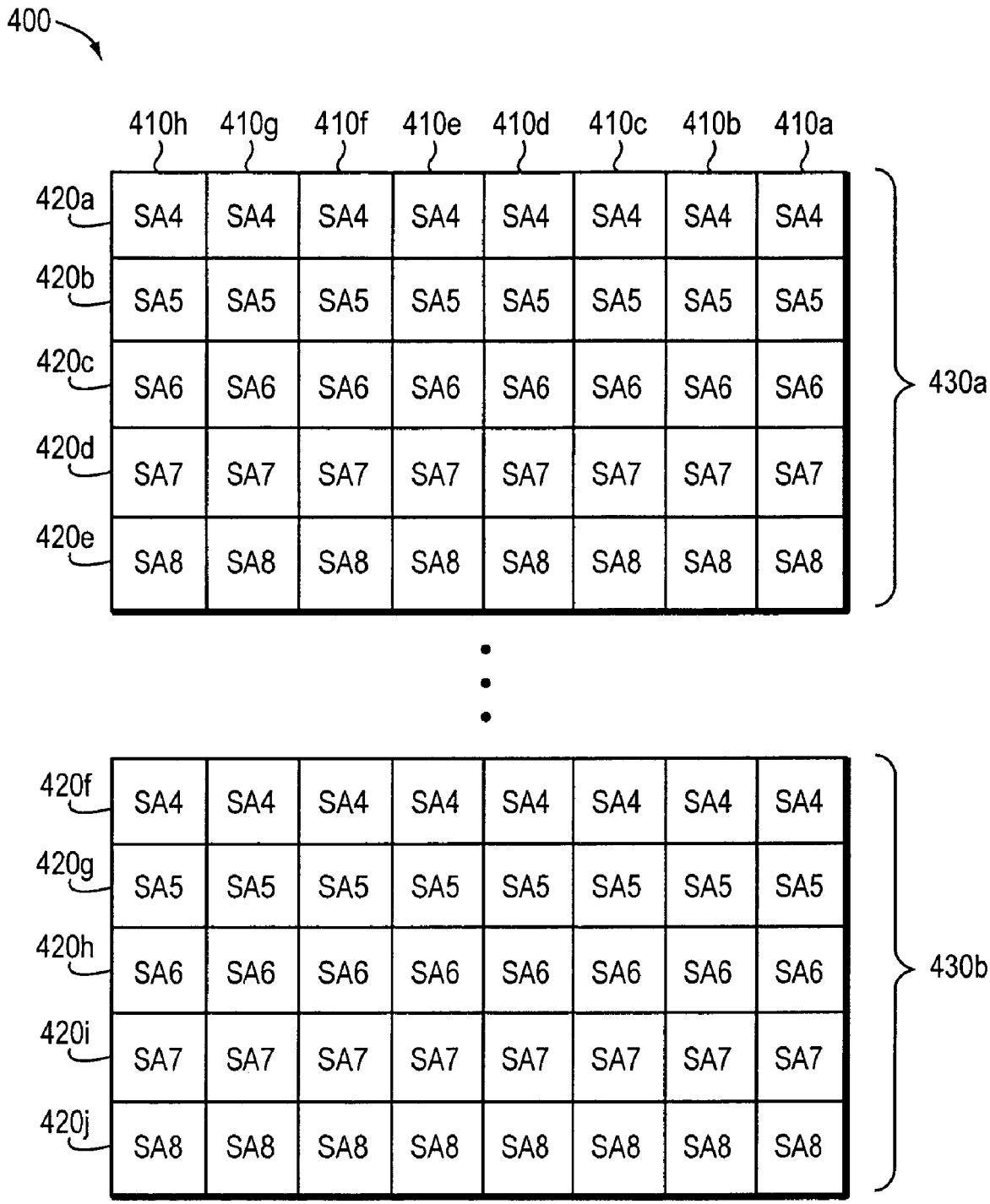
FIG. 4 illustrates a data buffer that may be used to buffer SA-bit information in accordance with an aspect of the present invention.

Illustratively, in accordance with an aspect of the present invention, SA bit information 228 is buffered in SA bit buffer 400 or the HDLC SA bit buffer 500, depending on whether the extracted SA bit data is transferred to the encoder 330 or HDLC controller 325a, respectively. FIG. 4 illustrates one way of organizing SA bit buffer 400 to hold SA bit information transferred to the encoder 330. Buffer 400 holds the SA bit data in a series of blocks 430 wherein each block 430 contains e.g., five bytes worth of SA bit data contained in eight frames 200 having NFAS information 230b. Each vertical section 410 of a block 430 holds the SA bit data 228 for a particular E1 frame 200 starting with the first frame 200 having NFAS information 230b in vertical section 410a and continuing to the eighth frame 200 having NFAS information 230b for that particular block in vertical section 410h. We have found that organizing the bits as such makes it easier to accommodate the odd number of bits contained in the SA bit data 228. It should be understood, though, that other techniques for buffering SA bit data 228 may be used with the present invention.

Illustratively, buffer 400 is large enough to hold up to five blocks 430 of SA bit data which is sufficient to hold up to 10 milliseconds (ms) of continuous TDM frames received at 125 microseconds (μs) per frame. In other words, assuming a TDM frame 200 containing SA bits 228 is received by the gateway 300 every 250 μs, the buffer 400 is large enough to hold up to 200 bits of SA bit data.

Figure 5:
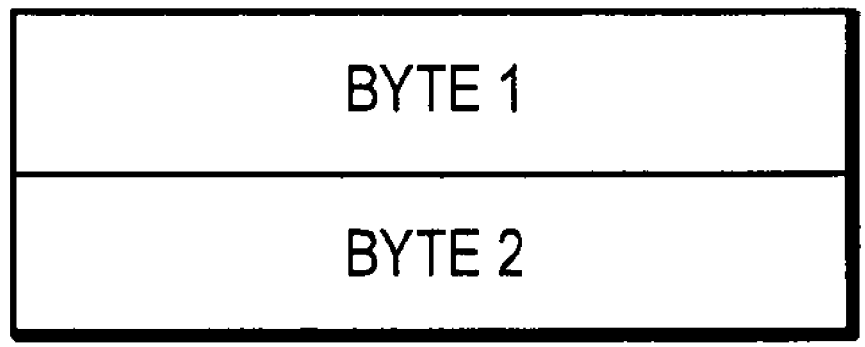
FIG. 5 illustrates a data buffer that may be used to buffer High-Level Data Link Control (HDLC) information in accordance with an aspect of the present invention.
Figure 5:
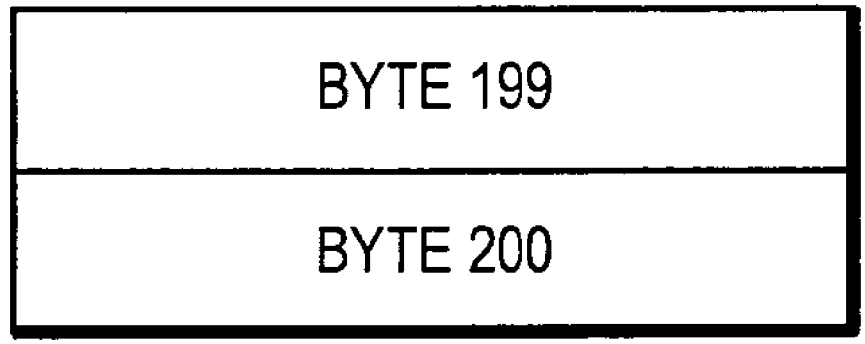

FIG. 5 illustrates one way of organizing HDLC SA bit buffer 500 to hold e.g., payload information associated with HDLC frames encoded in the SA bit data that are transferred to the HDLC controller 325a. Buffer 500 holds HDLC payload information as a series of bytes wherein each byte corresponds to a byte of HDLC information. Illustratively, buffer 500 is large enough to hold up to 200 bytes of HDLC information.

Figure 6:
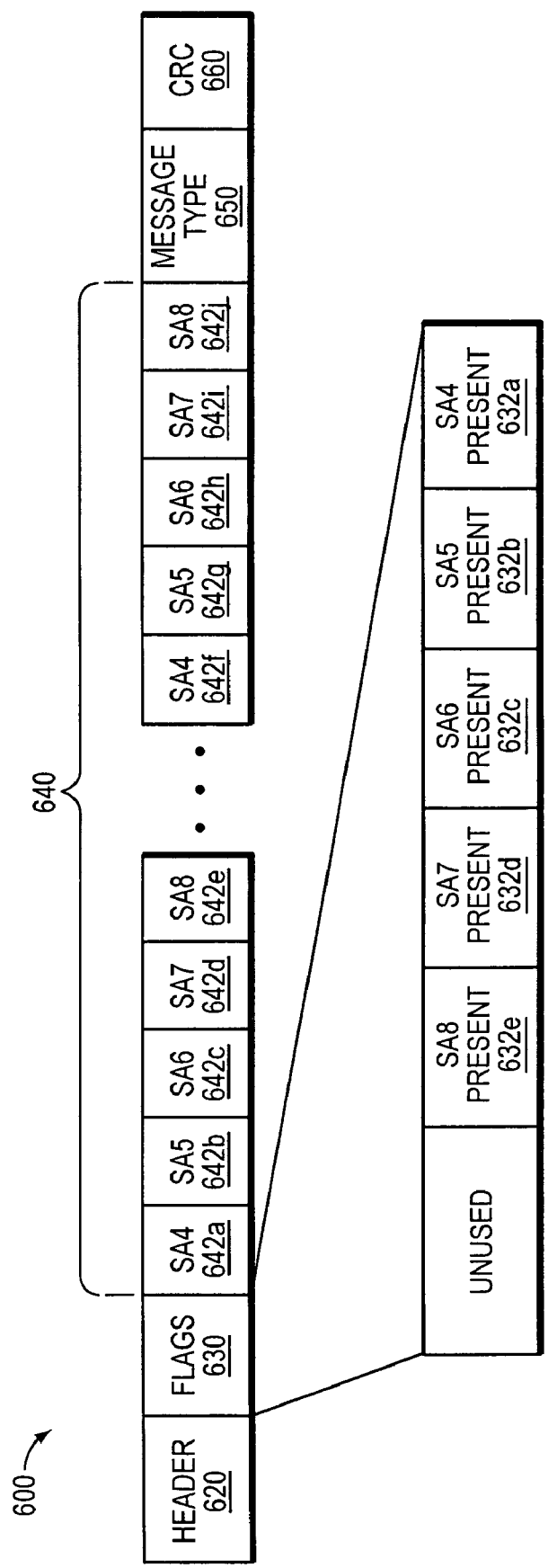
FIG. 6 illustrates a data packet that may be used to carry SA-bit information in a packet network in accordance with an aspect of the present invention.

As noted above, SA bit data are placed in packets prior to being transferred onto the packet network. FIG. 6 illustrates a packet 600 that maybe used to carry SA bit data buffered in buffer 400 across a packet network in accordance with an aspect of the present invention. Packet 600 is illustratively an AAL2 type 3 packet comprising a header field 620, a flags field 630, a SA bit portion 640, a message type field 650, and a cyclic redundancy check (CRC) field 660. It should be noted that other types of packets may be used with the present invention, such as an ATM AAL2 type 1 packets. Both AAL2 type 1 and type 3 packet formats are well-known and described in the ITU recommendation I.366.2, available from the ITU.

The header field 620 holds e.g., conventional AAL2 header information associated with the packet 600, such as a user-to-user indication (UUI) value and a length indication (LI) value (both not shown). The flags field 630 is preferably an 8-bit field which holds a value that represents a series of flags 632 which indicate the type of SA bits (e.g., SA4 bits, SA5 bits and so on) that are present in the SA bit portion 640 of the packet 600. For example, field 632a holds a flag value that indicates whether SA4 bits are presenting the packet's SA bit portion 640.

The SA bit portion 640 comprises one or more fields 642 wherein each field holds a value that represents up to a byte's worth of SA bit data. For example, field 642a holds up to a byte's worth of SA4 bit data. This byte's worth of data is illustratively the data contained in row 420a (FIG. 4) of block 430a. Likewise, field 642b holds a byte's worth of SA bit data that is illustratively the data contained in row 420b of block 430a and so on. The message type field 650 holds a value that indicates a type associated with the packet 600. Illustratively, this value is a binary value of B'111100 which indicates that packet 600 contains SA bit data. The CRC field 660 holds a value that represents e.g., a conventional CRC-10 cyclic redundancy check of the header field 620, flags field 630, SA bit portion 640 and message type field 650 of the packet 600.

Figure 7:
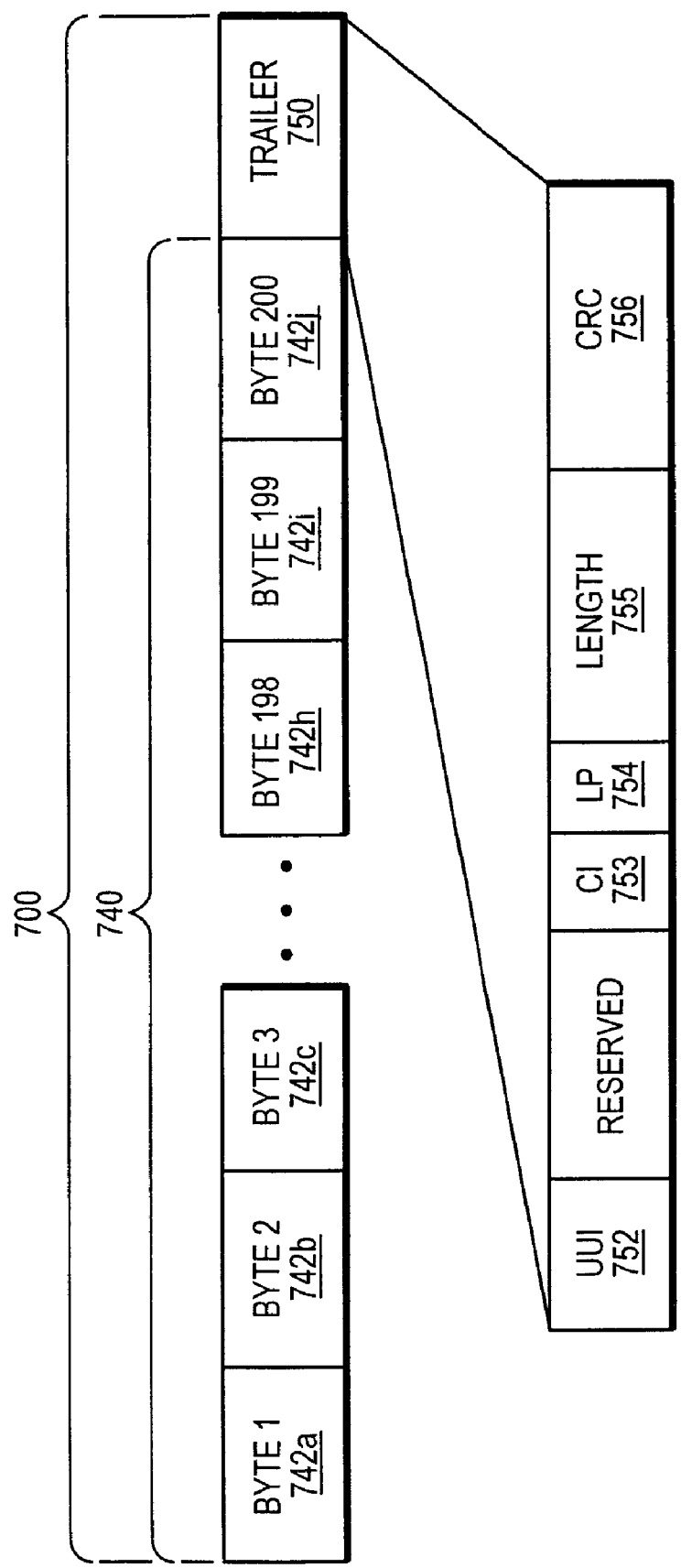
FIG. 7 illustrates a data packet that may be used to carry HDLC information in a packet network in accordance with an aspect of the present invention.

In accordance with an aspect of the present invention, HDLC information is carried in packets across the packet network 150. These packets are illustratively AAL2 packets that are combined to form a data frame which is used to transfer the HDLC information. FIG. 7 illustrates a data frame 700 that may be used to transfer HDLC information across a packet network in accordance with an aspect of the present invention. Frame 700 is illustratively a Service Specific Transmission Error Detection (SSTED) sublayer format frame described in ITU recommendation I.366.1, available from the ITU.

Frame 700 comprises a payload portion 740 and a trailer portion 750. The payload portion 740 contains one or more byte fields 742 wherein each field holds a byte of information associated with HDLC payload information. The trailer portion comprises a user-to-user indication (UUI) field 752, a congestion indicator (CI) field 753, a loss priority (LP) field 754, a length field 755 and a cyclic redundancy check (CRC) field 756. The UUI field 752 holds conventional user-to-user information. The CI field 753 holds a value that represents a congestion indicator and the LP field 754 holds a value that represents a loss priority. The length field 755 holds a value that represents a length of the payload portion in bytes. The CRC field 756 holds a value that represents a cyclic redundancy check which may be used to detect errors in the frame 700.

Figure 8:
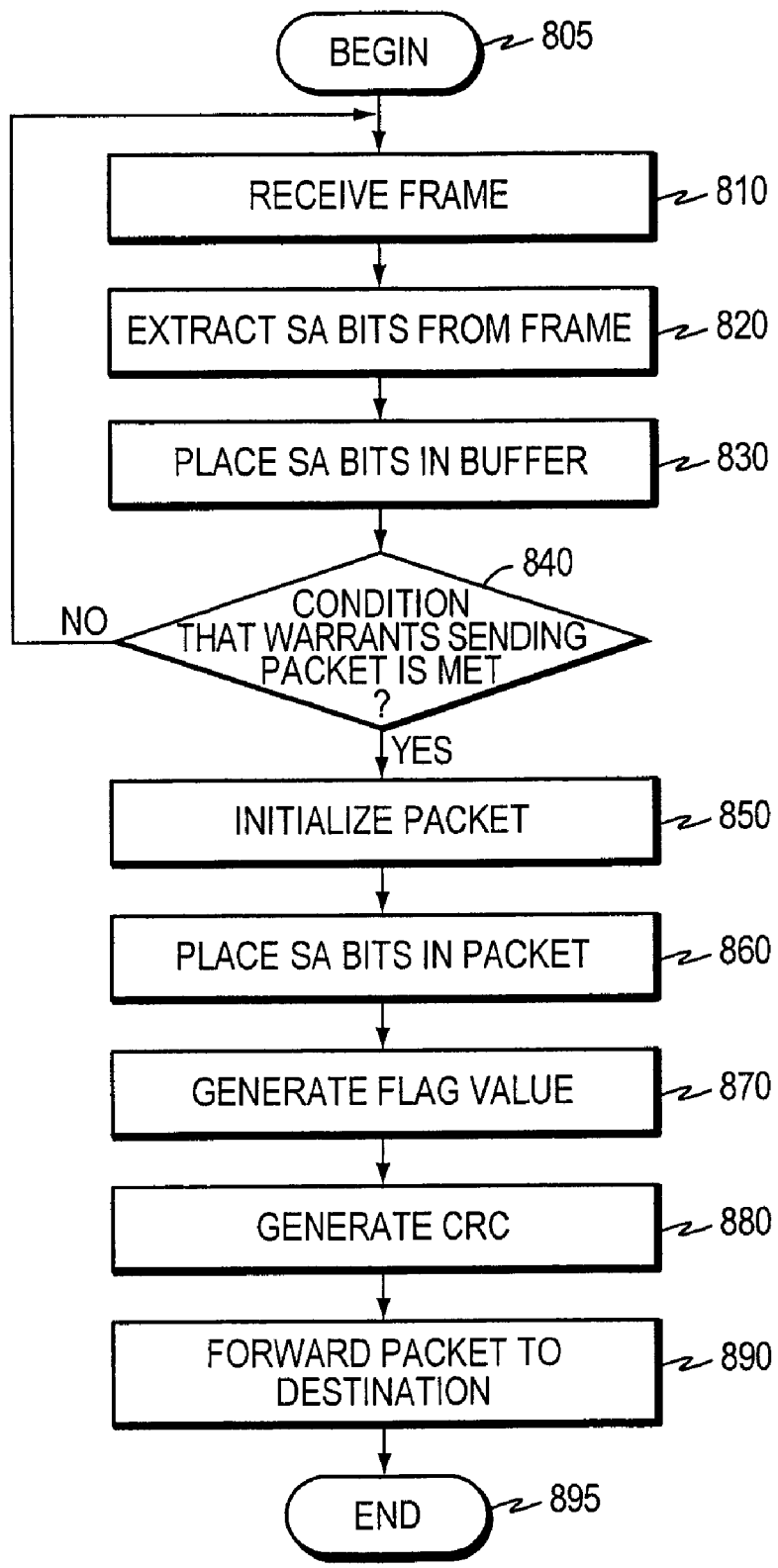
FIG. 8 is a flowchart of a sequence of steps that may be used to transfer SA bit data contained in TDM frames onto a packet network in accordance with an aspect of the present invention.

As noted above, SA bit data contained in TDM frames are buffered and the buffered data are placed into the SA bit portion 640 of packets 600 which are then transferred over the packet network 150. FIG. 8 is a flowchart of a sequence of steps that may be used to configure e.g., a gateway 300 to transfer SA bit data contained in TDM frames onto a packet network in accordance with an aspect of the present invention. The sequence begins at step 805 and proceeds to step 810 where the gateway 300 receives a TDM frame 200 containing SA bits 228. At step 820, the gateway 300 extracts the SA bits 228 from the frame 200 and places the SA bits 228 in the buffer 400 (step 830), as described above. At step 840, the gateway 300 performs a check to determine if a condition that warrants sending a packet 600 is met. This condition may be, e.g., that a predetermined number of SA bits (e.g., 200 bits) have been placed in the buffer 400, that a predetermined period of time has elapsed (e.g., 10 ms) and so on.

If the condition has not been met, the sequence returns to step 810. Otherwise, the sequence proceeds to step 850 where the gateway 300 initializes a packet 600. This initialization may include establishing a value for the header 620 and placing the above-described message type in the message type field 650. At step 860, the gateway 300 places the SA bits contained in buffer 400 into the SA bit field 640 of the packet 600, as described above. At step 870, the gateway 300 generates a flag value to indicate which SA bits are present in the packet 600 and places the generated flag value in the flags field 630. At step 880, the gateway 300 then generates a CRC value for the packet 600 and places the generated CRC in the packet's CRC field 660. Next, at step 890, the gateway 300 forwards the packet 600 onto the packet network towards its destination. The sequence ends at step 895.

In an embodiment of the invention, a packet 600 containing SA bits is not sent unless the SA bit pattern changes in successive received frames 200 or a period of time has elapsed. For example, assume the last received frame 200 whose SA bits have been included in an already sent packet 600 contained a particular SA bit pattern. Further, assume that the SA bit pattern in successive frames 200 received by a gateway 300 has not changed for some predetermined period of time (e.g., 5 seconds) beyond the time a packet 600 would normally be sent from the gateway (e.g., 10 ms). Rather than send a packet 600 containing the unchanged SA bit pattern each time the buffer 400 would normally fill up (e.g., every 10 ms), a packet 600 containing the SA bit pattern is sent after the predetermined period of time has elapsed (e.g., every 5 seconds).

Figure 9:
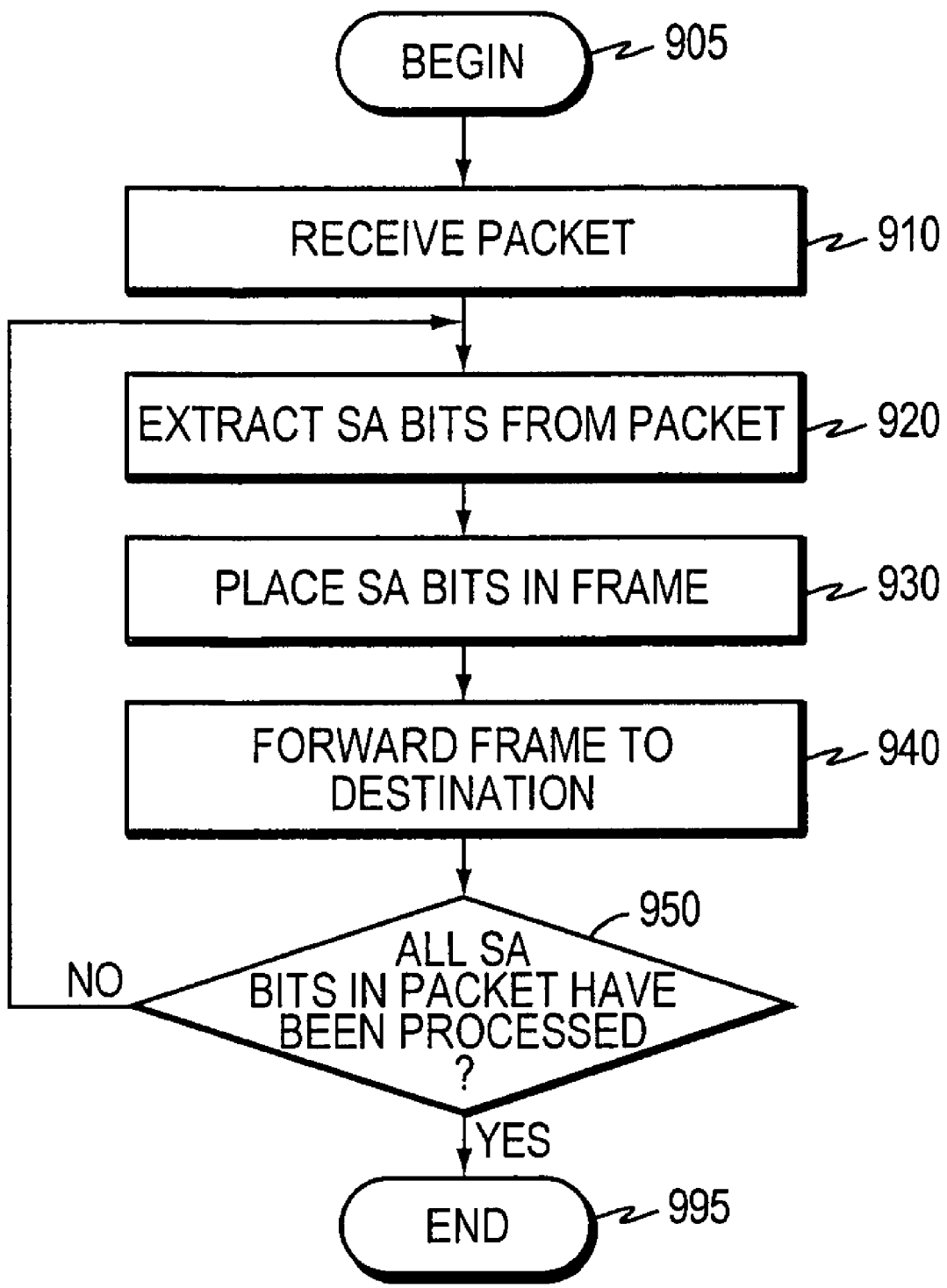
FIG. 9 is a flowchart of a sequence of steps that may be used to transfer SA bit data contained in a packet onto a TDM network in accordance with an aspect of the present invention.

In accordance with an aspect of the present invention, SA bit information contained in a packet 600 is placed, by a gateway 300 receiving the packet 600, into one or more TDM frames for transfer over the TDM network. FIG. 9 is a flowchart of a sequence of steps that may be used to e.g., configure a gateway 300 to process a packet 600 containing SA bit information in accordance with an aspect of the present invention. The sequence begins at step 905 and proceeds to step 910 where the gateway 300 receives the packet 600. The gateway 300 then extracts SA bits 640 from the packet 600 (step 920) and places them in a TDM frame 200 (step 930). At step 940, the TDM frame 200 is then forwarded towards its destination via the TDM network. At step 950, a check is performed to determine if all of the SA bits in the packet 600 have been processed (i.e., sent in TDM frames). If not, the sequence returns to step 920 to process (send) the next set of SA bits. Steps 920-950 are repeated until all of the SA bits in the received packet 600 have been sent. The sequence ends at step 995.

For example, referring to FIGS. 8 and 9, assume gateway 300a receives an E1 frame 200 containing SA bit data from TDM switch 130a (step 810) and that the frame 200 is destined for TDM switch 130b. The gateway's TDM interface 310 receives the frame 200 and transfers it to the demultiplexor 315. The demultiplexor 315 demultiplexes the frame into 32 data streams (one for each channel) and transfers the data stream associated with "channel 0" to the SA bit extractor 320.

The SA bit extractor 320 extracts the SA bits 228 from the data stream associated with "channel 0" (step 820) and transfers the bits 228 to the encoder 330 where they are placed in buffer 400 (step 830). After a condition that warrants sending a packet 600 has occurred (step 840) (e.g., a predetermined number of bits have been buffered in the buffer 400), the encoder transfers the SA bits from the buffer 400 to the encapsulator 335 which initializes a packet 600 (step 850) and places the SA bits from the buffer 400 into the initialized packet 600 (step 860). The encapsulator 335 then generates and places a flags value in the packet's flags field 630 (step 870), and generates and places a CRC value in the packet's CRC field 660 (step 880). The gateway 300 then forwards the packet 600 onto the packet network 150 towards gateway 300b which is coupled to TDM switch 130b (step 890).

The packet interface 340 of gateway 300b eventually receives the packet 600 (step 910) and transfers it to the decapsulator 345. The decapsulator 345 extracts the SA bit data from the packet and transfers it to the decoder 350 (step 920). The decoder 350 transfers the SA bit data to the SA bit inserter 360 which inserts the SA bit data into one or more NFAS values 230b generated by the framer 365 (step 930). The generated NFAS values 230b are transferred to the multiplexor 355 which places the NFAS values 230b into frames 200 and which forwards the frames 200 to the TDM interface 310 for transfer onto the TDM network (steps 920-950).

Figure 10:
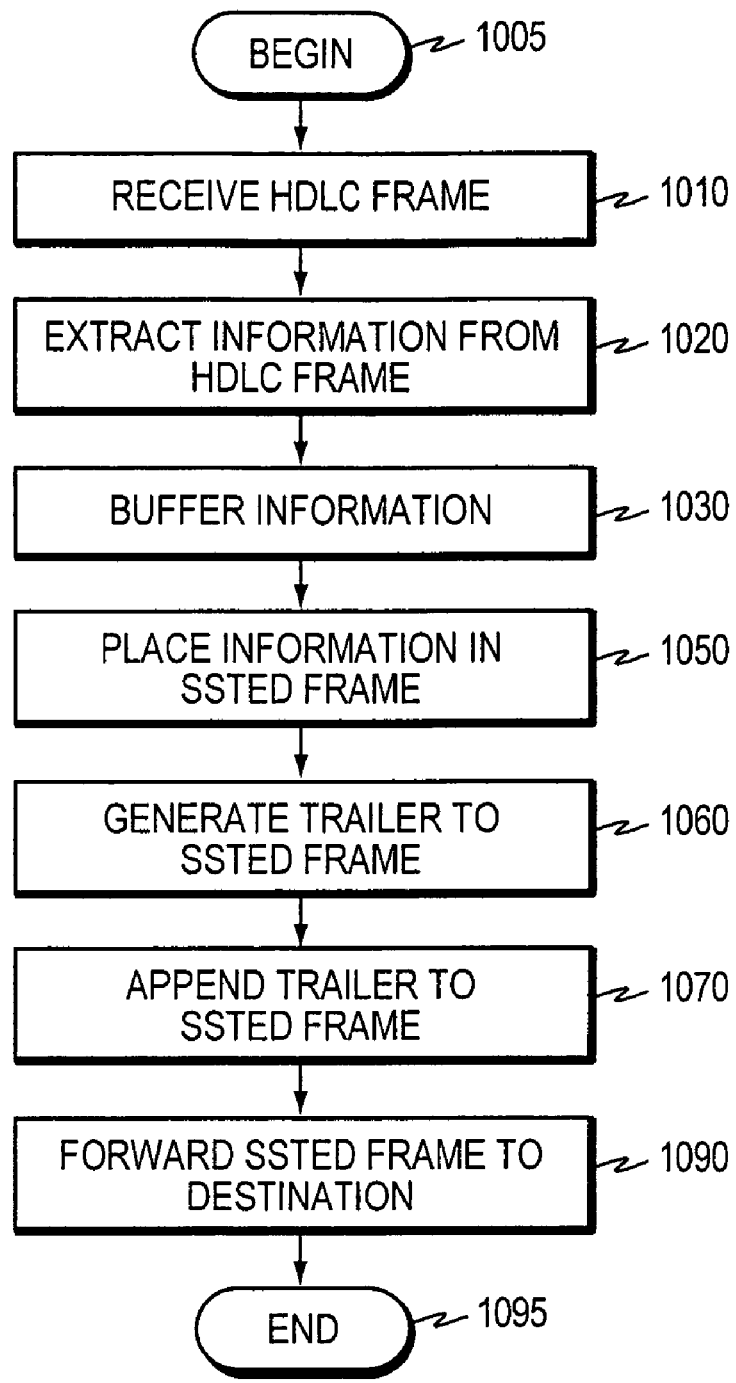
FIG. 10 is a flowchart of a sequence of steps that may be used to transfer information contained in HDLC frames onto a packet network in accordance with an aspect of the present invention.

As noted above, one or more TDM frames 200 received by a gateway 300 may contain HDLC information (e.g., payload data) encoded in the SA bits 228 of the frames 200. FIG. 10 is a flowchart of a sequence of steps that may be used to transfer this information from a TDM network onto a packet network in accordance with an aspect of the present invention. The sequence begins at step 1005 and proceeds to step 1010 where an HDLC frame containing the information is received from the TDM network. The information is extracted from the HDLC frame (step 1020) and buffered (step 1030) e.g., in buffer 500 as described above. Next, at step 1050, the information is placed in the payload portion 740 of a SSTED frame. The trailer for the SSTED frame is generated (step 1060) and appended to the frame (step 1070). The frame is then forwarded to the destination via the packet network (step 1090). The sequence ends at step 1095.

Figure 11:
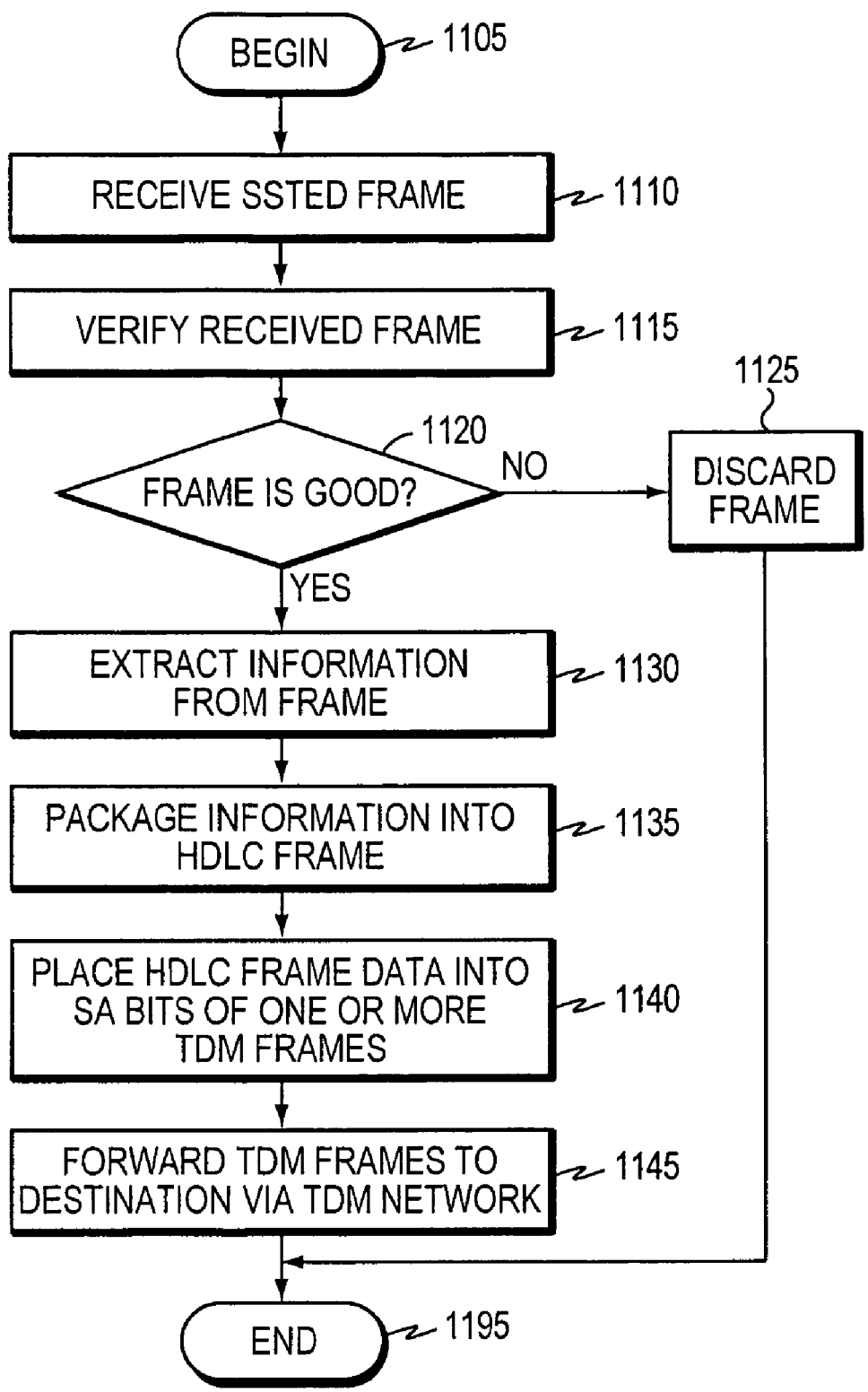
FIG. 11 is a flowchart of a sequence of steps that may be used to transfer HDLC information contained in a packet onto a TDM network in accordance with an aspect of the present invention.

FIG. 11 is a flowchart of a sequence of steps that may be used to transfer HDLC information contained in e.g., a SSTED frame 700 received from a packet network onto a TDM network in accordance with an aspect of the present invention. The sequence begins at step 1105 and proceeds to step 1110 where a SSTED frame 700 is received from the packet network. Next, at step 1115, the frame is verified e.g., by performing a cyclic redundancy check using the frame's CRC value 756. If the results of the verification indicate the frame is no good (e.g., cyclic redundancy check failed), the frame is discarded (step 1125) and the sequence proceeds to step 1195. Otherwise, if the results of the verification indicates the frame is good (e.g., cyclic redundancy check passed), sequence proceeds to step 1130 where the information is extracted from e.g., the payload portion 740 of the SSTED frame 700. Next, at step 1135, the extracted information is placed into the payload portion of an HDLC frame. The HDLC frame is then placed into one or more TDM frames (step 1140) and the TDM frames are transferred onto the TDM network (step 1145). The sequence ends at step 1195.

For example, referring to FIGS. 10 and 11, assume gateway 300a receives one or more E1 frames 200 containing HDLC frames from TDM switch 130a. Further assume the E1 frames 200 are destined for TDM switch 130b (step 1010). The gateway's TDM interface 310 receives the frames 200 and transfers them to the demultiplexor 315. The demultiplexor 315 demultiplexes the frames 200 into 32 data streams (one for each channel) and transfers the data stream associated "channel 0" to the SA bit extractor 320.

The SA bit extractor 320 extracts the HDLC frames from the data stream associated with "channel 0" (step 1020) and transfers the HDLC frames to the HDLC controller 325a which places HDLC information (e.g., payload information) contained in the HDLC frames in buffer 500 (step 1030). The HDLC controller 325a transfers the HDLC information from the buffer 500 to the encapsulator 335 which initializes a SSTED frame 700 and places the HDLC information into the payload field 740 of the frame 700 (step 1050). The encapsulator 335 then generates the values for the frame's trailer 750 (step 1060) and appends the trailer to the frame 700 (step 1070). The gateway 300 then forwards the frame 700 onto the packet network towards its destination (step 1090).

Assume the frame's destination is gateway 300b and the frame 700 has reached its destination. The packet interface 340 of gateway 300b receives the frame 700 (step 1110) and verifies it, as described above (step 1115). Assuming the frame 700 is good, the decapsulator 345 extracts the HDLC information from the frame's payload 740 and transfers it to the HDLC controller 325b where it is packaged into an HDLC frame (step 1135). The HDLC frame is transferred to the SA bit inserter 360 which inserts data from the HDLC frame into the SA bit field 228 of one or more NFAS values 320b generated by the frame sync generator 365. The NFAS values 320b are then transferred to the multiplexor 355 which places the NFAS values 320b into TDM frames 200 and transfers the TDM frames 200 to the TDM interface 310 for transfer onto to the TDM network (step 1145).

Figure 12:
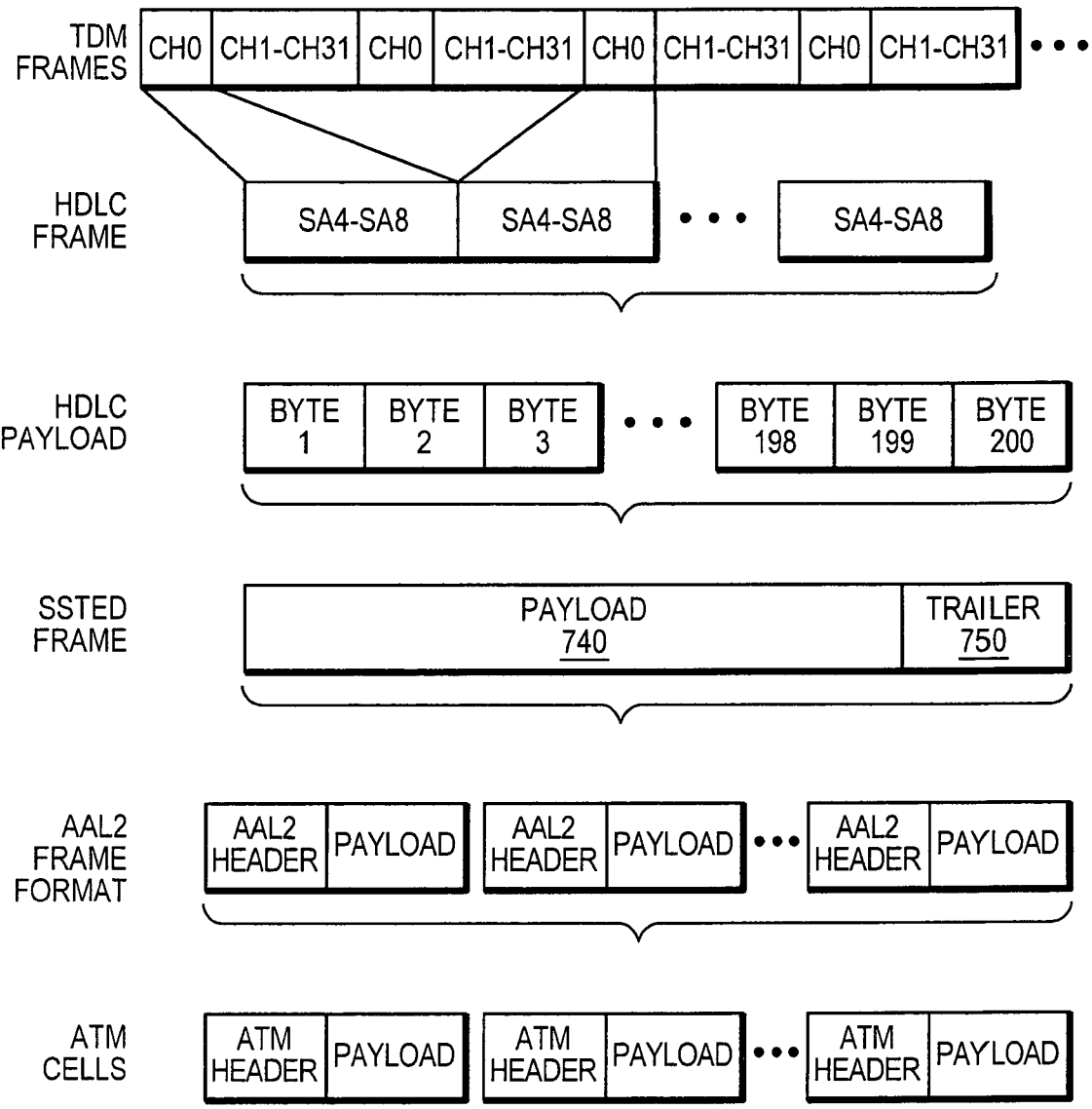
FIG. 12 illustrates placing synchronization channel information from TDM frames into packets in accordance with an aspect of the present invention.

FIG. 12 illustrates the placing of synchronization channel information contained in TDM frames into SSTED frames and breaking down the SSTED frames into ATM cells for transfer onto an ATM packet network in accordance with an aspect of the present invention. Referring to FIG. 12, SA bit information 228 from "channel 0" of the TDM frames are used to form an HDLC frame. HDLC payload information is extracted from the HDLC frame and buffered. The buffered information is placed in the payload field 740 of an SSTED frame 700, and a trailer 750 is generated and appended to the frame 700. SSTED frame 700 is segmented and placed into one or more AAL2 frame format packets. The AAL2 frame format packets are further segmented into one or more ATM cells which are transferred onto the ATM packet network.

Figure 13:
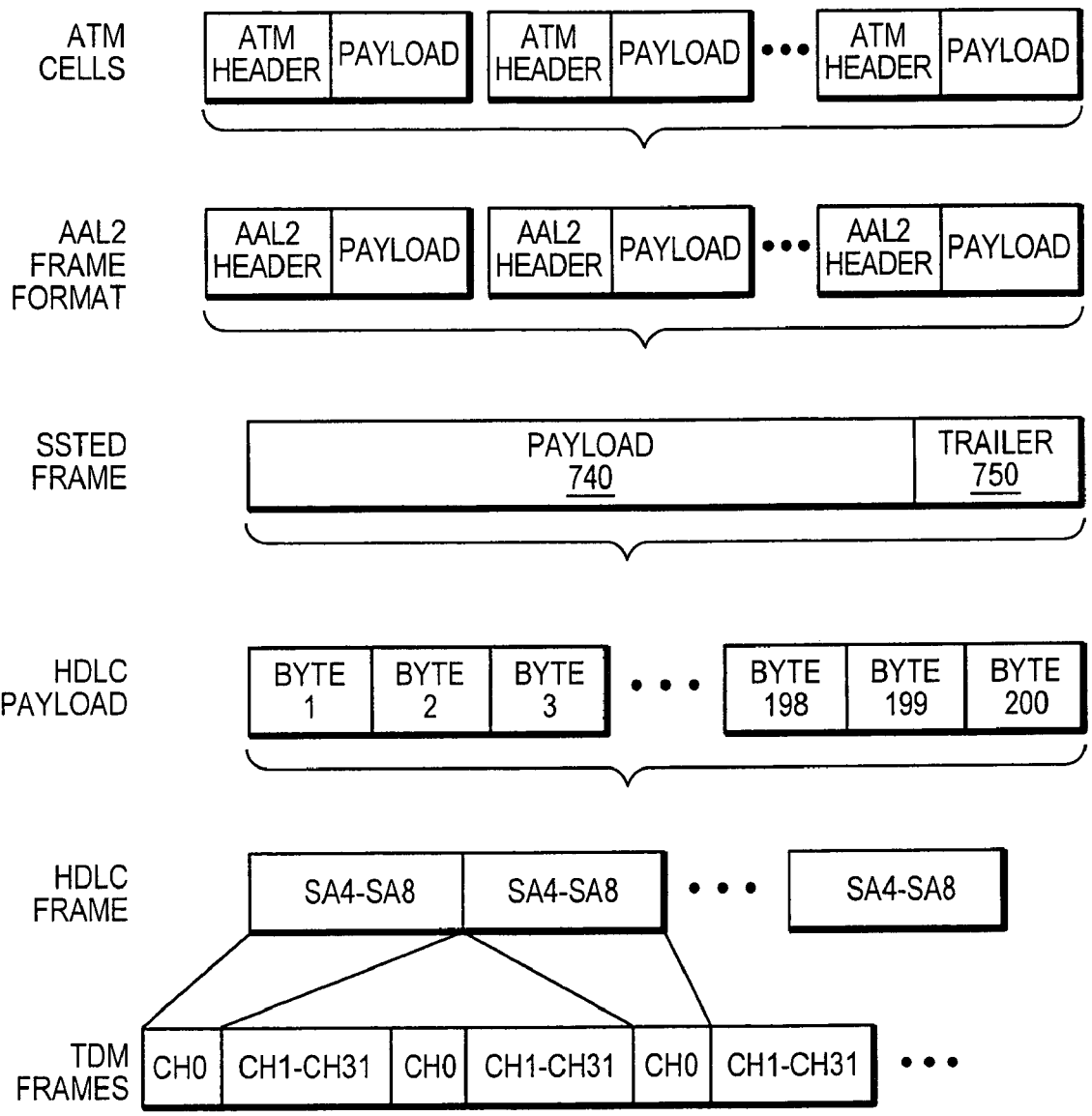
FIG. 13 illustrates placing synchronization channel information contained in packets into TDM frames in accordance with an aspect of the present invention.

FIG. 13 illustrates the placing of HDLC information contained in SSTED frames into TDM frames in accordance with an aspect of the present invention. Referring to FIG. 13, one or more ATM cells containing SSTED frames are combined to form AAL2 frame format packets. The AAL2 frame format packets are, in turn, combined to form an SSTED frame 700. The trailer 750 of the SSTED frame 700 is used to determine if the frame is good, as described above. The payload portion 740 of the frame 700 is buffered to form the HDLC payload. This payload is then placed in an HDLC frame which is, in turn, placed in the SA bits of TDM frames 200.

The above embodiments of the invention describe the invention as used with E1 TDM frames. It should be noted, however, that other TDM frame formats, such as T1 and DS0, may take advantage of the present invention. Likewise, the above embodiments of the invention describe the invention as used with SSTED frames and AAL2 packets. This too is not meant to be a limitation of the invention. It should be noted that other frame and/or packet formats may be used to transport synchronization channel data across a packet network.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for preserving information contained in time division multiplexing (TDM) frames received from a TDM network, the information preserved in packets transmitted across a packet network, the method comprising:
   receiving a plurality of TDM frames, each TDM frame having a synchronization channel, the synchronization channels alternating, over at least three TDM frames, between carrying a frame alignment signal portion having a synchronization pattern used to locally synchronize transfer of the TDM frames and a non-frame alignment signal portion containing other information that is not TDM frame synchronization information;
   extracting the other information contained in the non-frame alignment portion of the synchronization channels, the extracted other information representing information other than synchronization information;
   placing the extracted other information into a non-synchronization information portion of an outgoing packet; and
   transmitting the outgoing packet onto the packet network.

2. A method as defined in claim 1 wherein the packet is an Asynchronous Transfer Mode (ATM) Adaptation Layer 2 (AAL2) packet.

3. A method as defined in claim 1 further comprising:
   (a) generating a cyclic redundancy check (CRC) for the packet; and
   (b) placing the CRC into the packet.

4. A method as defined in claim 1 further comprising:
   (a) generating a flag that indicates when the extracted other information from the synchronization channel are present in the packet; and
   (b) placing the flag into the packet.

5. A method as defined in claim 1 wherein the extracted other information is transferred onto the packet network after an amount of the extracted other information has been placed in a buffer.

6. A method as defined in claim 1 wherein the extracted other information is transferred onto the packet network after a predetermined amount of time has elapsed.

7. A method as defined in claim 1 wherein the TDM frame is an E1 frame.

8. An apparatus for preserving information contained in time division multiplexing (TDM) frames received from a TDM network, the information preserved in packets transmitted across a packet network, the apparatus comprising:
   a TDM interface configured to receive a of TDM frames, each TDM frame having a synchronization channel, the synchronization channels alternating, over at least three TDM frames, between carrying a frame alignment signal portion having a synchronization pattern used to locally synchronize transfer of TDM frames and a non-frame alignment signal portion containing other information that is not TDM frame synchronization information;
   an extractor configured to extract the other information contained in the non-frame alignment portion of the synchronization channels, the extracted other information representing other than synchronization information; and
   an encapsulator configured to:
      (a) place the extracted other information into a packet, and
      (b) forward the packet onto the packet network.

9. An apparatus as defined in claim 8 further comprising:
   a buffer accessible to the encapsulator and configured to store the extracted other information.

10. An apparatus as defined in claim 9 wherein the packet is forwarded after a predetermined amount of the extracted other information has been stored in the buffer.

11. An apparatus as defined in claim 8 wherein the packet is forwarded after a predetermined period of time has elapsed.

12. An apparatus for transferring information contained in time division multiplexing (TDM) frames onto a packet network, the apparatus comprising:
   means for receiving a plurality of TDM frames, each TDM frame having a synchronization channel, the synchronization channels alternating, over at least three TDM frames, between carrying a frame alignment signal portion having a synchronization pattern used to locally synchronize transfer of TDM frames and a non-frame alignment signal portion containing other information that is not TDM frame synchronization information;
   means for extracting the other information contained in the non-frame alignment portion of the synchronization channels, the extracted other information representing information other than synchronization information;
   means for placing the extracted other information into a packet; and
   means for forwarding the packet onto the packet network.

13. A system for preserving data information contained in time division multiplexing (TDM) frames received from a TDM network in packets transmitted across a packet network, the system comprising:
   a first node configured to:
      (a) receive a plurality of TDM frames, each TDM frame having a synchronization channel, the synchronization channels alternating, over at least three TDM frames, between carrying a frame alignment signal portion having a synchronization pattern used to locally synchronize transfer of TDM frames and a non-frame alignment signal portion containing other information that is not TDM frame synchronization information;
      (b) extract other information contained in the non-frame alignment portion of the synchronization channels, the extracted other information representing information other than synchronization information;
      (c) place the extracted other information into a packet, and
      (d) forward the packet onto the packet network; and
   a second node configured to:
      (a) receive the packet,
      (b) extract the other information from the packet, and
      (c) place the extracted data other information into a synchronization channel of a second TDM frame.

14. A computer-readable medium comprising computer-executable instructions executed by a computer for:
   receiving a plurality of time division multiplexing (TDM) frames, each TDM frame having a synchronization channel, the synchronization channels alternating, over at least three TDM frames, between carrying a frame alignment signal portion having a synchronization pattern used to locally synchronize transfer of TDM frames and a non-frame alignment signal portion containing other information that is not TDM frame synchronization information;
   extracting the other information contained in the non-frame alignment portion of the synchronization channels, the extracted other information representing information other than synchronization information;
   placing the extracted other information into a packet; and
   forwarding the packet onto a packet network.

15. A method as defined in claim 1 wherein the extracted other information is payload data.

16. A method as defined in claim 1 wherein the extracted other information are SA bits.

17. A method as defined in claim 1 wherein the extracted other information are from a non-Frame Alignment Signal (non-FAS) portion of the TDM frame.

18. A method as defined in claim 1 wherein the extracted other information are encoded High level Data Link Control (HDLC) frames.

19. A method as defined in claim 1 farther comprising:
   delaying the step of transmitting the outgoing packet until observing a pattern change in the non-frame alignment signal portion of the synchronization channel of successive received frames.

20. A method as defined in claim 1 further comprising:
   delaying the step of transmitting the outgoing packet until after a predetermined period of time has elapsed.

21. A method as defined in claim 18 further comprising:
   receiving the HDLC frames from the packet network;
   extracting the other information from the HDLC frames;
   placing the other information in a payload portion of a service specific transmission error detection (SSTLD) frame; and
   transmitting the SSTED frame to a destination via the packet network.

22. The method as defined in claim 21 further comprising:
   generating a cyclic redundancy check (CRC) of the SSTED from at a destination;
   discarding the received frame in an event the CRC fails; and
   otherwise extracting the other information from the payload portion of the SSTED frame.

* * * * *

UNITED STATES PATENT AND TRADEMARK OFFICE
CERTIFICATE OF CORRECTION

PATENT NO. : 7,627,004 B2
APPLICATION NO. : 11/138599
DATED : December 1, 2009
INVENTOR(S) : Mekala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Second Day of November, 2010

David J. Kappos
*Director of the United States Patent and Trademark Office*